United States Patent [19]
Hara et al.

[11] Patent Number: 5,175,861
[45] Date of Patent: Dec. 29, 1992

[54] LOCK PROCESSING SYSTEM

[75] Inventors: Tadashi Hara; Koichi Tada, both of Tokyo, Japan

[73] Assignee: NEC Corporation, Tokyo, Japan

[21] Appl. No.: 812,853

[22] Filed: Dec. 23, 1991

Related U.S. Application Data

[63] Continuation of Ser. No. 420,818, Oct. 12, 1989, abandoned.

[30] Foreign Application Priority Data

Oct. 14, 1988 [JP] Japan ............................. 63-257034

[51] Int. Cl.⁵ .......................................... G06F 13/14
[52] U.S. Cl. ...................... 395/725; 364/246.8; 364/230; 364/DIG. 1; 364/969.2; 364/DIG. 2
[58] Field of Search ............ 395/725; 364/246.8, 364/230, DIG. 1, 969.2, DIG. 2

[56] References Cited
U.S. PATENT DOCUMENTS

| | | | |
|---|---|---|---|
| 4,308,580 | 12/1981 | Ohtaki | 364/200 |
| 4,402,046 | 8/1983 | Cox et al. | 364/200 |
| 4,480,304 | 10/1984 | Carr et al. | 364/200 |
| 4,513,367 | 4/1985 | Chan et al. | 395/425 |
| 4,587,609 | 5/1986 | Boudreau et al. | 364/200 |
| 4,805,106 | 2/1989 | Pfeifer | 364/200 |
| 4,937,733 | 6/1990 | Gillett, Jr. et al. | 364/200 |
| 4,984,153 | 1/1991 | Kregness et al. | 364/200 |

*Primary Examiner*—Michael R. Fleming
*Assistant Examiner*—Glenn A. Auve
*Attorney, Agent, or Firm*—Foley & Lardner

[57] ABSTRACT

A lock processing system which judges locking requests from a plurality of processors. The lock processing system contains two system control units. Locking or unlocking information is transferred between the two system control units. The lock processing system stores the information transferred between the two system control units and judges whether there is a conflict for locking or unlocking. The lock processing system dispenses with hardware otherwise needed for transferring between system control units.

4 Claims, 7 Drawing Sheets

LOCK PROCESSING SYSTEM

This application is a continuation of application Ser. No. 07/420,818, filed Oct. 12, 1989, now abandoned.

BACKGROUND OF THE INVENTION

The present invention relates to a lock processing system connecting a plurality of system control apparatuses, each control apparatus being connected to a plurality of processors.

For an example of a prior art lock processing system, reference may be made to the U.S. Pat. No. 4,308,580. In the system, lock data are held in a main memory unit (MMU) 3 connected to multiprocessors 1 and 2. The data are read out of the MMU 3 in response to a locking an unlocking request. The lock data are stored into the MMU 3 after a lock or unlock judgement, or merging of the lock data, so that the system made inoperative can be unlocked.

The prior art system, however, may inhibit memory accessing from another processor through competition between memories because it requires an access to the MMU 3 in response to lock or unlock judgement processing.

Further, as the memory access to the MMU 3 takes time, an additional time length is taken from the generation of a locking request until the completion of a lock judgement. The prior art system moreover has the disadvantage of being unable to make consecutive lock judgements.

SUMMARY OF THE INVENTION

One object of the present invention is to provide a lock processing system free from the above disadvantages and enabled to reduce the hardware quantity required for transferring data for lock processing.

Another object of the invention is to provide a lock processing system free from the above disadvantages and made capable of fast checking of the overall lock status under simplified control.

Still another object of the invention is to provide a lock processing system free from the above disadvantages and made capable of always being updated and processing consecutive lock processing.

A system according to one aspect of the invention is a lock processing system connecting a plurality of system control apparatuses each of which is connected to a plurality of processors and has a locking function for exclusive control, comprising:

first lock information storage means for storing lock information supplied from a processor connected to the own system control apparatus;

transfer means for mutually transferring, between the own system control apparatus and another system control apparatus connected thereto, lock information from processors connected to each system control apparatus;

second lock information storage means for storing lock information supplied from a processor connected to the other system control apparatus via the transfer means;

own system lock judging means for judging, on the basis of lock information from the first lock information storage means, whether or not locking of the own system has been successful; and other system lock judging means for judging, on the basis of lock information from said second lock information storage means, whether or not locking of the other system has been successful.

BRIEF DESCRIPTION OF THE DRAWINGS

The arrangement, features and advantages of the present invention will become more apparent from the following detailed description when taken in conjunction with the accompanying drawings in which.

In the figures, the same reference numerals denote respectively the same constituent elements.

DETAILED DESCRIPTION OF THE PREFERRED EMBODIMENT

Figure 1:
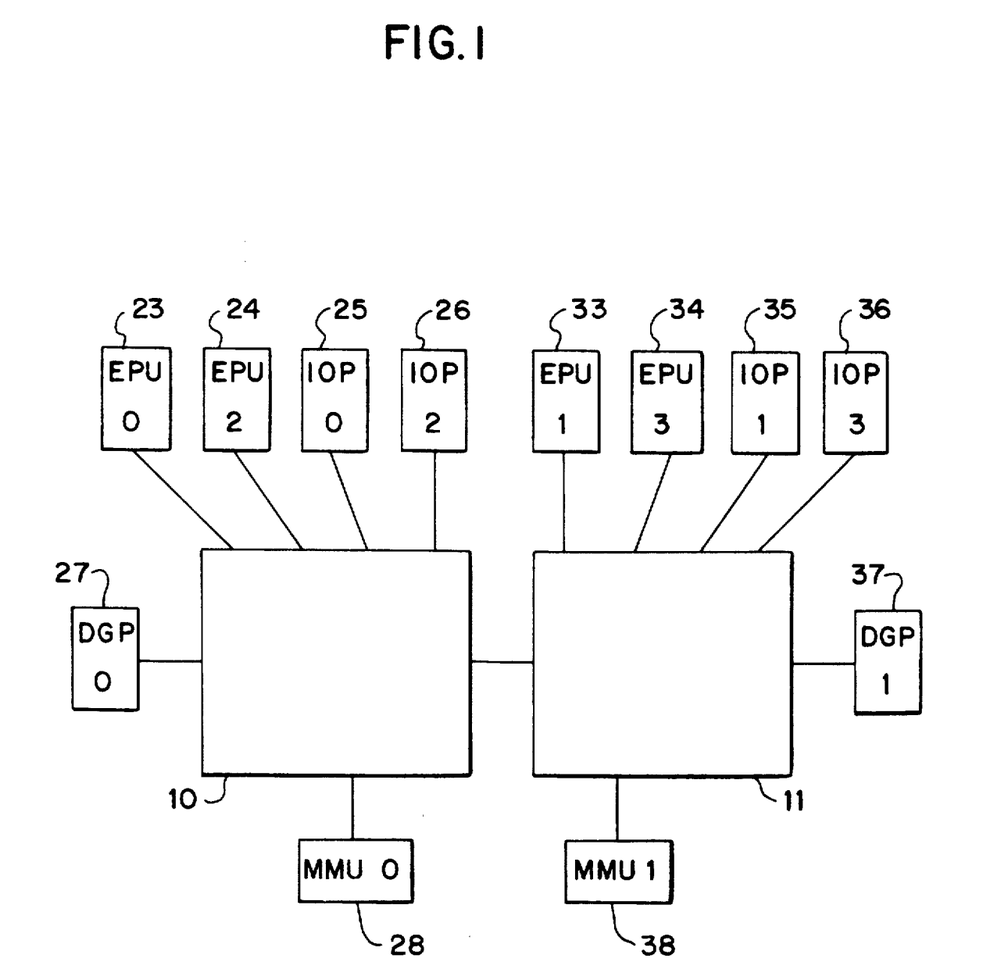
FIG. 1 illustrates a system applicable to the invention.

Referring to FIG. 1, a lock processing system applicable to the present invention comprises arithmetic processors 23 and 24 and input/output units 25 and 26 for generating locking requests; a diagnostic processor 27; a main memory unit (MMU) 28; a system control unit 10, connected to these units 23-28, for receiving locking requests from the units 23-26; arithmetic processors 33 and 34 and input/output units 35 and 36 for generating locking requests; a diagnostic processor 37, an MMU 38, and a system control unit 11, connected to the units 33-38 and the system control unit 10, for receiving locking requests from the units 33-36.

Figure 2:
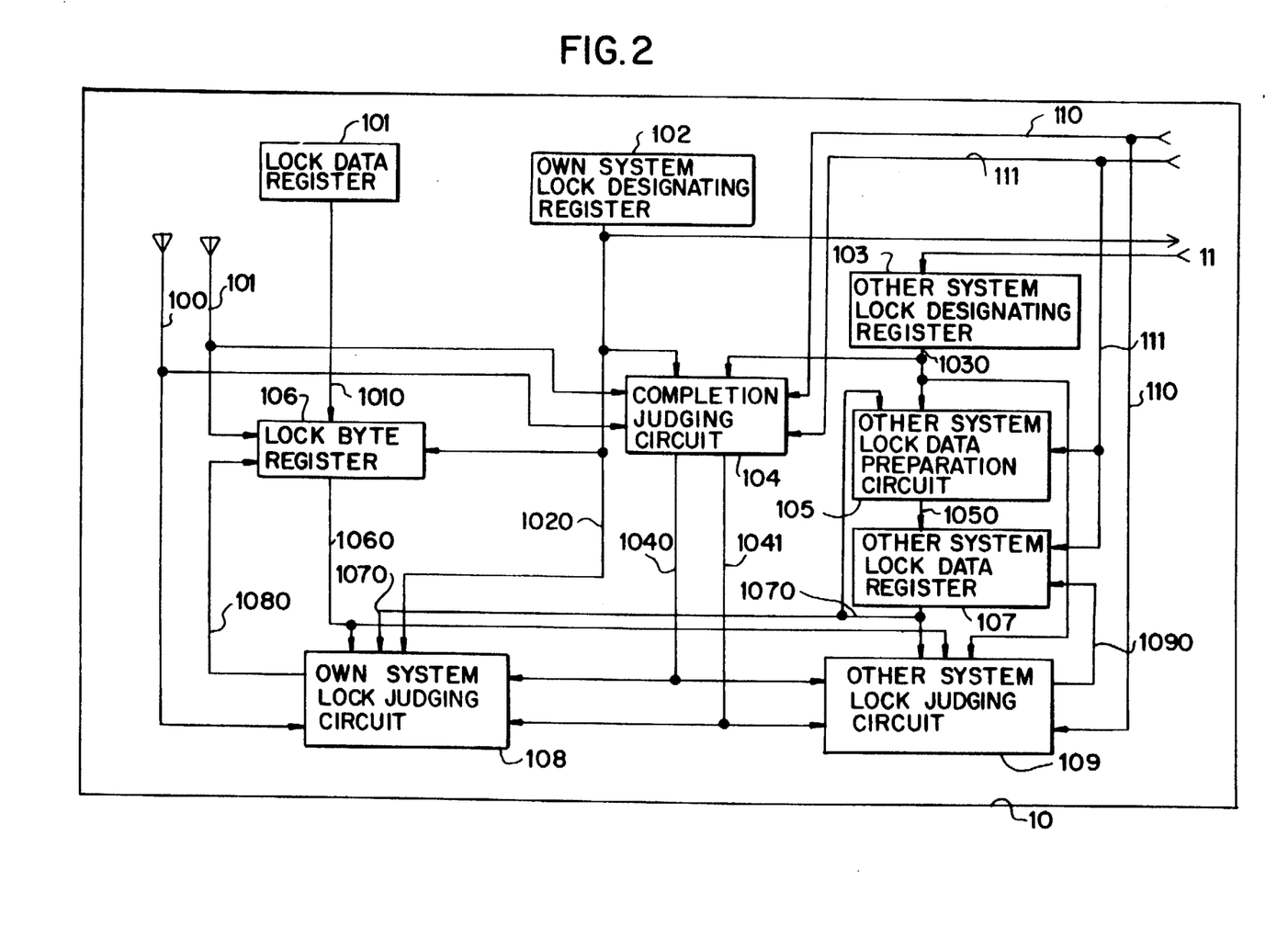
FIG. 2 illustrates the arrangement of the essential part of a preferred embodiment of the invention.

In this system, the system control units 10 and 11 transfer between each other locking requests from the units 23-26 and 33-36, respectively, to perform lock judgement for each and hold lock information. Referring to FIGS. 1 and 2 together, the system control units 10 and 11, which constitute the essential part of a preferred embodiment of the present invention, are connected to each other. They will be described below, with the system control unit 10 assumed to be the unit for the own system and the system control unit 11, that for the other system.

Referring now to FIG. 2 alone, the system control unit 10 comprises a lock data register 101 for storing lock data; a lock designating register 102 for storing a lock designating signal for the own system; an other system lock designating register 103 for storing a lock designating signal supplied from the system control unit 11 of the other system; a competition judging circuit 104 for passing judgement when locking requests are simultaneously given from the own and other systems, the competition judging circuit 104 generating a signal indicating a lock competition or an unlock competition in accordance with the designating signals from the registers 102 and 103 an other system lock data preparing circuit 105 for generating lock data for the other system upon successful locking or unlocking; a lock byte register 106 responsive to an own system successful lock signal supplied via a line 1080 or an own system unlocking request received from the unit 10 via a line 101 for storing the corresponding lock byte, out of the lock data from the register 101, into a position indicated by the own system lock data designating signal supplied from the register 102; an other system lock data register 107 responsive to an other system successful lock signal supplied via a line 1090 or an other system lock designating signal supplied from the unit 11 via a line 111 for storing data from the other lock data preparing circuit 105; an own system lock judging circuit 108 for judging whether or not the own system has been successfully locked on the basis of the lock byte from the lock byte register 106, the own lock designating signal from the lock designating circuit 102, the lock competition signal and the unlock competition signal from the competition judging circuit 104, and the own system locking request signal supplied from the unit 10 via a line 100, and responsive to successful locking of the own system for generating an own system successful lock signal on the line 1080; and an other system lock judging circuit 109 for judging whether or not the other system has been successfully locked on the basis of the lock byte from the lock byte register 106, the other system lock data from the other system lock data register 107, the other system lock designating signal from the other system lock designating circuit 103, the lock competition signal and the unlock competition signal from the competition judging signal 104, and the other system locking request signal supplied from the unit 11 via a line 110, and responsive to successful locking of the other system for generating an other system successful lock signal on the line 1090.

Next will be described in detail the operation of the preferred embodiment of the present invention with reference to drawings.

Referring to FIGS. 1 and 2, when a locking request or requests from at least one of the processors 23 to 26 is provided to the own system control unit 10, the own system lock judging circuit 108 judges whether or not the own system has been successfully locked on the basis of the lock byte provided from the lock byte register 106 via a line 1060, the own lock designating signal provided from the lock designating circuit 102 via a line 1020, the lock competition signal and the unlock competition signal provided from the competition judging circuit 104 via lines 1040 and 1041, respectively, the other system lock data provided from the register 107 via a line 1070, and the own system locking request signal provided from the unit 10 via the line 100.

This judging action will now be described in detail with reference to FIGS. 2 and 3.

Figure 3:
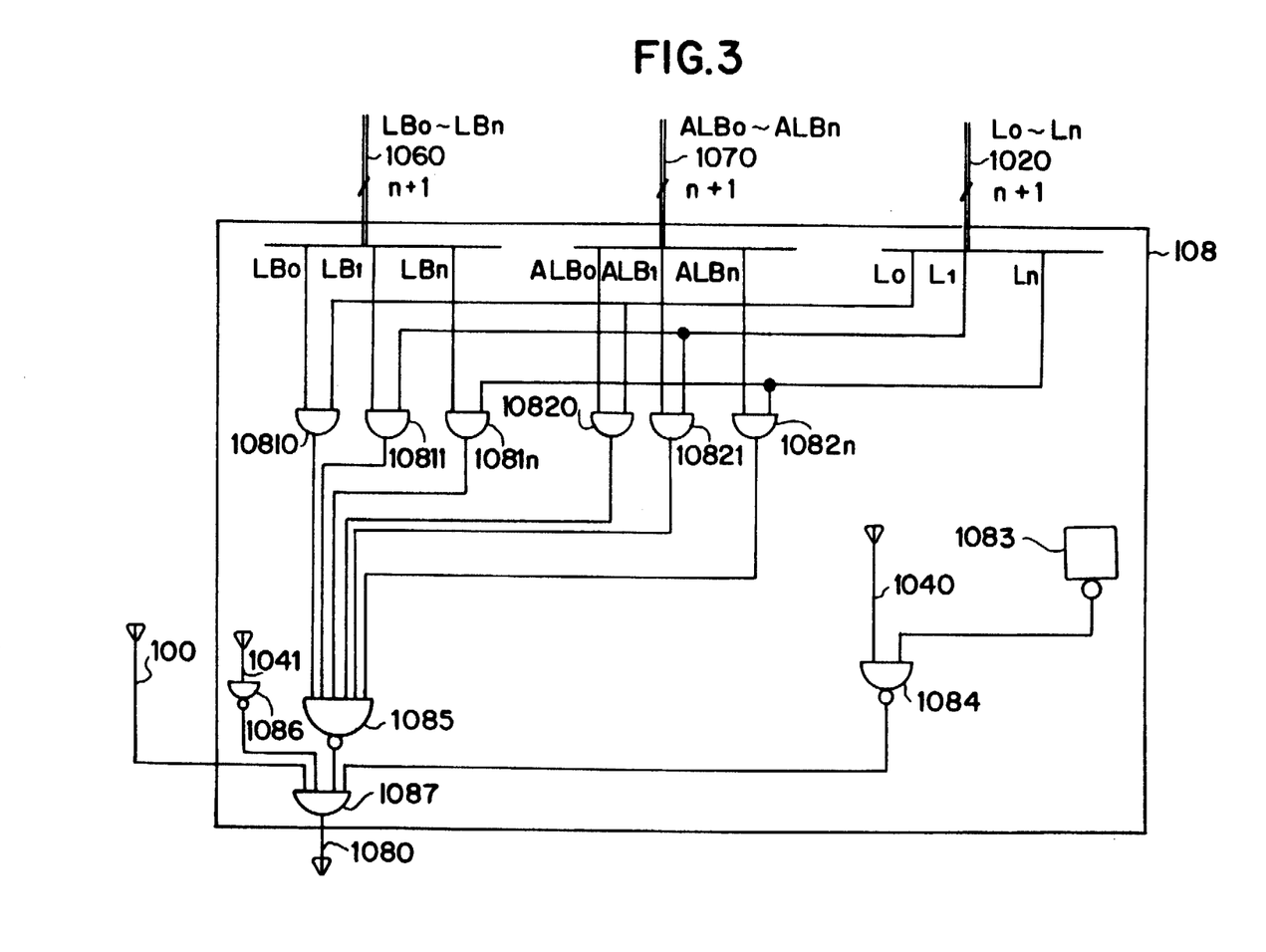
FIG. 3 illustrates the arrangement of the own system lock judging circuit 108 shown in FIG. 2.

Referring to FIG. 3, the own system lock judging circuit 108 judges whether or not the own system has been successfully locked. A successful lock means that the byte designated by the lock designating signal is not locked at the time the lock is requested, i.e. the designated lock byte is "0". Therefore, the logical product of the lock designating signal supplied via the line 1020 and the lock byte supplied via the line 1060 is obtained by a group of AND gates 10810-1081n. Also, the logical product of the other system lock data supplied via the other system lock data register 107 via the line 1070 and the lock designating signal supplied via the line 1020 is obtained by another group of AND gates 10820-1082n. Then the non-disjunction of the AND from the AND gate group 10810-1081n and that from the AND gate group 10820-1082n is obtained by a NOR gate 1085. If logical "1" is output from this NOR gate 1085, the locking will be successful as a rule, though the unlock competition signal supplied from the competition judging circuit 104 via the line 1040 inhibits successful locking. The own system lock judging circuit 108 is further provided with a flip-flop (F/F) 1083 which supplies a signal to indicate the priority of processing between an own system locking request and an other system locking request when the two requests are competitively generated at the same time. In the own system control unit 10, when the output signal of the F/F 1083 is logical "0", the priority is given to the other system, and when it is logical "1", the own system has the priority. The reverse is true with the other system control unit 11. Thus, when the output signal of the F/F 1083 is logical "1", the priority is given to the other system, and when it is logical "0", the own system has the priority.

The non-conjunction of the lock competition signal supplied from the competition judging circuit 104 via the line 1040 and the output of the competition-priority F/F 1083 is obtained by a NAND gate 1084. This NAND inhibits successful locking. If none of these inhibitions is done by an AND gate 1087, an own system successful lock signal will be generated on the line 1080.

In response to this own system successful lock signal, the lock byte register 106 stores the corresponding lock byte among the lock data, provided from the register 101 via a line 1010, into a position indicated by the own system lock designating signal provided from the register 102 via the line 1020.

Figure 4:
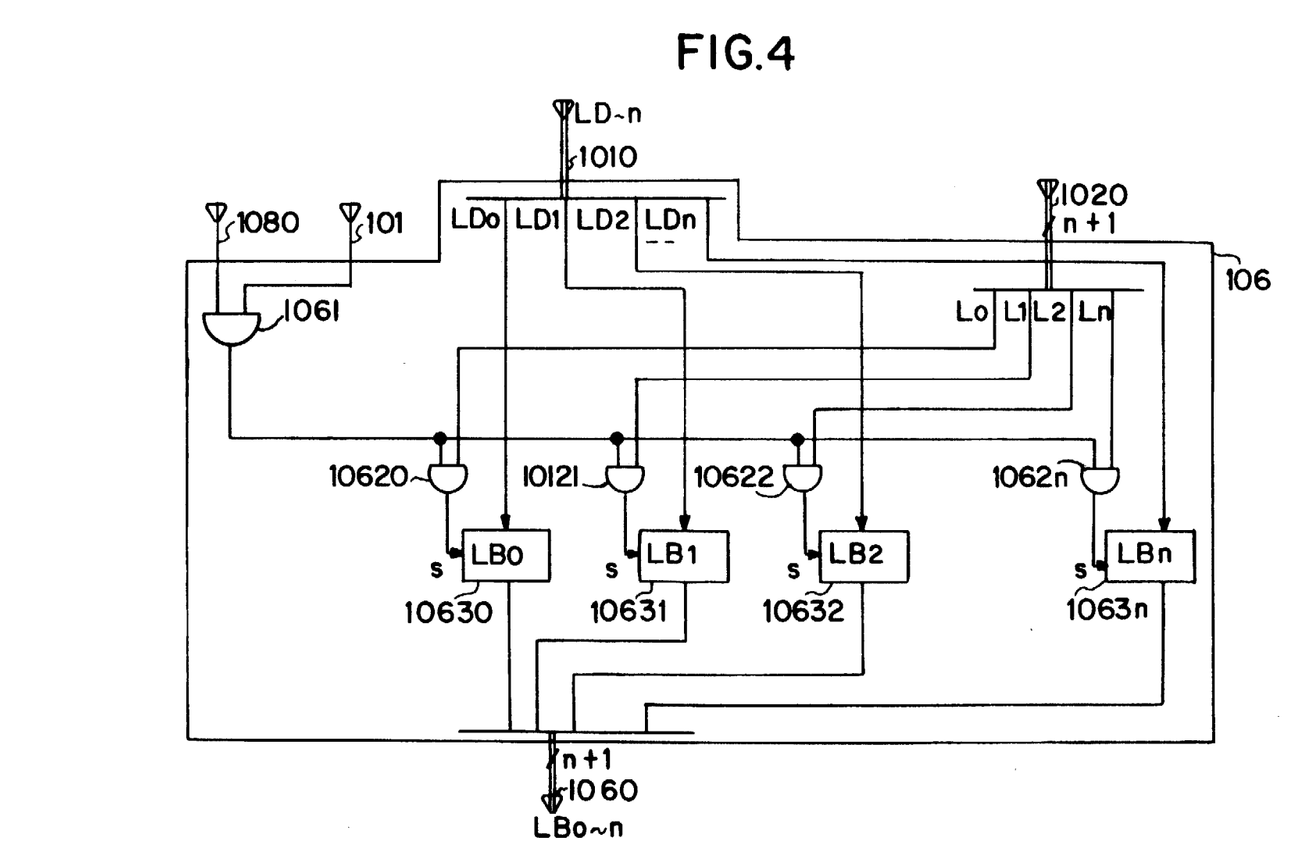
FIG. 4 illustrates the arrangement of the lock byte register 106 shown in FIG. 2.

Referring now to FIGS. 2 and 4, the logical sum of the own system successful lock signal supplied from the own system lock judging circuit 108 via the line 1080 and the own system unlocking request signal supplied via the line 101 is obtained by an OR gate 1061. The logical product of this OR and the lock designating signal supplied via the line 1020 is obtained by a group of AND gates 10620-1062n. With this AND as the set signal, the lock bytes supplied via the line 1010 are set into F/F's 10630-1063n. The units 23-26 shown in FIG. 1, which are the request sources, originate lock data of logical "0". Therefore, the lock byte register 106 stores lock bytes of "0" in response to an unlock request.

Referring to FIGS. 1 and 2, requests from the processors 33-36 connected to the other system control unit 11 are processed by the other system. In order to let the own system reflect these requests, however, the lock designating signal from the lock designating register of the other system control unit 11 is transmitted to the unit 10. This lock designating signal is stored into the other system lock designating register 103.

Then, the other system lock data is prepared by the other system lock data preparing circuit 105 at the time of successful locking and at the time of unlocking, and the other system lock data thereby prepared are stored into the other system lock data register 107. This operation will be described in detail below with reference to FIGS. 2 and 5.

Figure 5:
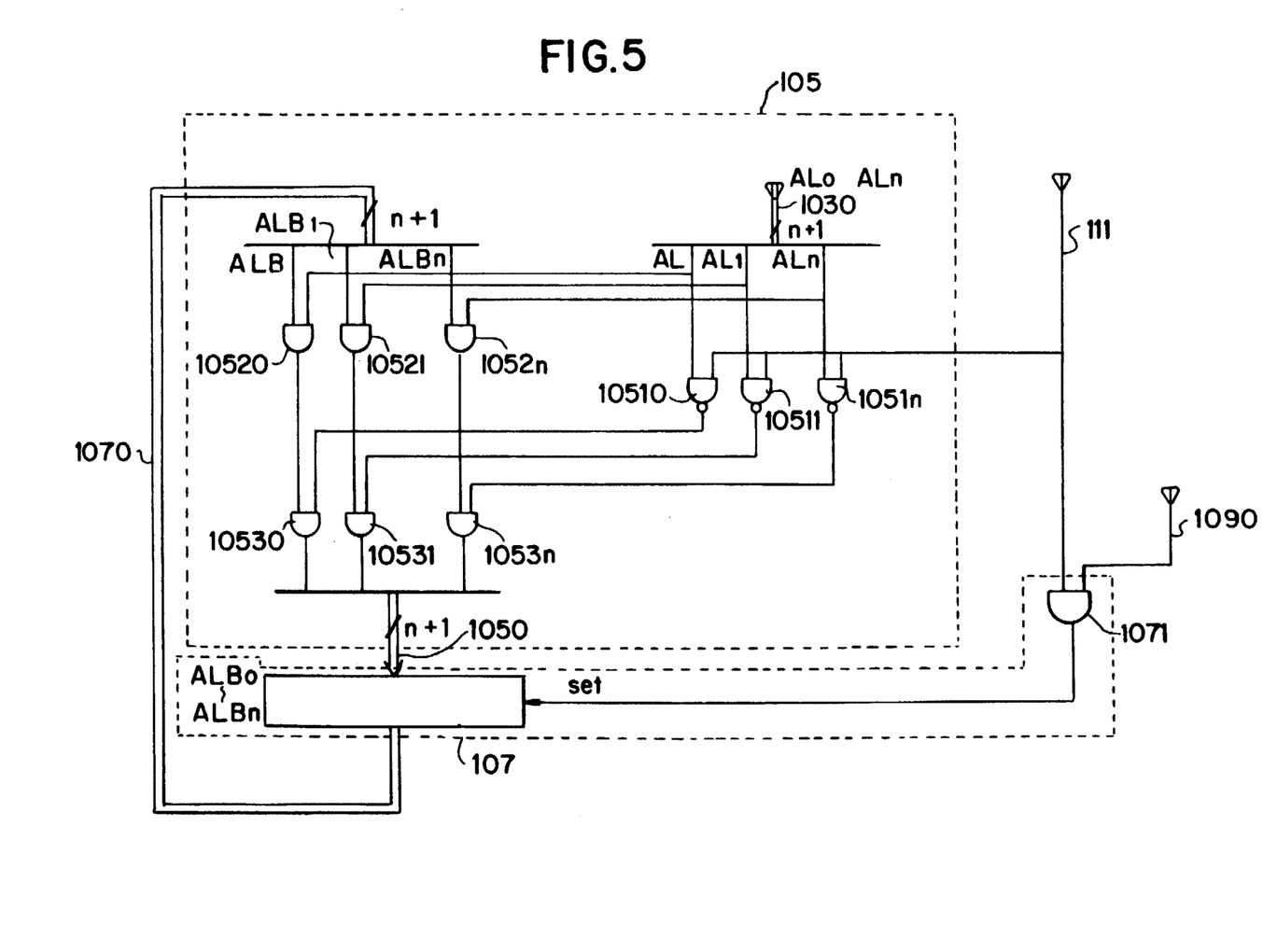
FIG. 5 illustrates the arrangement of the other system lock data preparing circuit 105 and the other system lock data register 107 shown in FIG. 2.

Referring to FIGS. 2 and 5, the non-conjunction of the locking request signal or signals provided from the other system (at least one of the processors 33-36 in FIG. 1) via the line 111 and the other system lock designating signal provided from the other system lock designating circuit 103 via a line 1030 is obtained by a group of NAND gates 10510-1051n. Also, the logical sum of the other system lock data provided from the other system lock data register 107 via the line 1070 and the other system lock designating signal provided from the other system lock designating register 103 via the line 1030 is obtained by a group of OR gates 10520-1052n. Then, the logical product of the output of the OR gate group 10520-1052n and that of the NAND gate group 10510-1051n is obtained by a group of AND gates 10530-1053n. Thus, if a lock is requested, the logical sum of the other system lock data and the other system lock designating system will be obtained by the OR gate group 10520-1052n, while if an unlock is requested, the position designated by the other system lock designating signal will be turned to "0", merging will take place so that the other system lock data are without change.

The other system lock data thereby generated are stored into the other system lock data register 107. The set signal therefor is the OR, obtained by an OR gate 1071, of an unlocking request signal provided from the other system via the line 111 and an other system successful lock signal provided from the other system lock judging circuit 109 via the line 1090.

This other system successful lock signal is prepared in the following manner.

Figure 6:
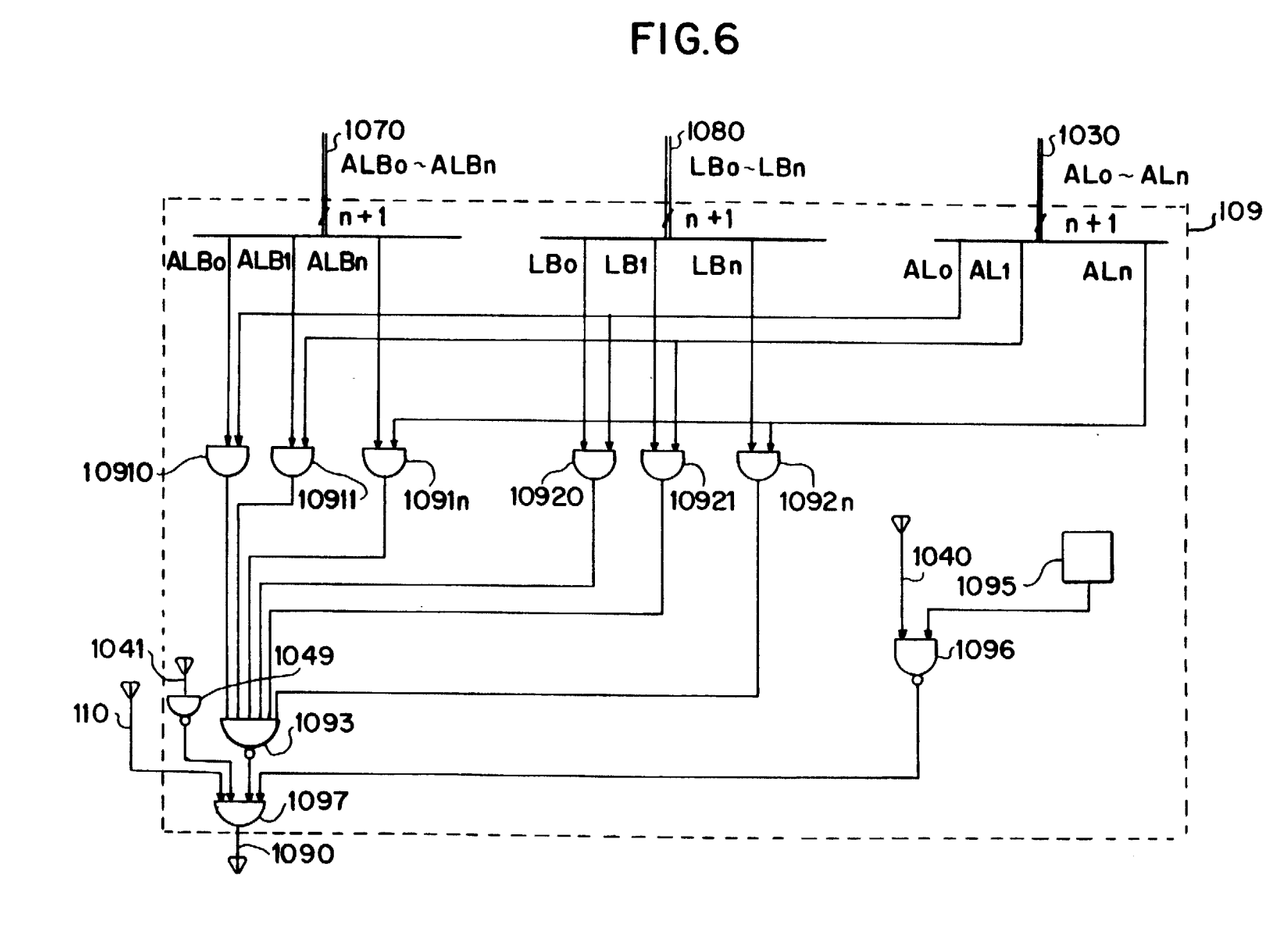
FIG. 6 illustrates the arrangement of the other system lock judging circuit 109 shown in FIG. 2.

Now referring to FIGS. 2 and 6, the logical product of the other system lock data supplied from the other system lock data register 107 via the line 1070 and the other system lock designating signal provided from the other system designating register 103 via the line 1030 is obtained by a group of AND gates 10910-1091n. Also, the logical product of this other system lock designating signal and the lock byte provided from the lock byte register 106 via the line 1060 is obtained by another group of AND gates 10920-1092n. Then the non-disjunction of the outputs of these AND gate groups 10910-1091n and 10920-1092n is obtained by a NOR gate 1093.

Thus the logical products of the other system lock designating signal and the bits of the other system lock data and lock byte are obtained and, if no coincidence is found, the output of the NOR gate 1093 will be "1" to give a signal indicating a successful lock. If, however, an unlock competition signal is provided from the competition judging circuit 104 via the line 1041, the successful lock signal is inhibited by an AND gate 1097 via a gate 1094. A competition-priority F/F 1095 performs the same function as the F/F 1083 of the own system lock judging circuit 108. Therefore the two F/F's 1095 and 1083 may be the same. The non-conjunction of the lock competition signal provided from the competition judging circuit 104 via the line 1040 and the output of the F/F 1095 is obtained by a NAND gate 1096. This NAND inhibits the a successful lock indicating signal.

Unless these inhibitions are effected by the AND gate 1097, an own system successful lock signal will be generated on the line 1090.

Next will be described in detail how the lock competition signal supplied to the own system lock judging circuit 108 and the other system lock judging circuit 109 via the line 1040 and the unlock competition signals supplied via the line 1041 are prepared.

Figure 7:
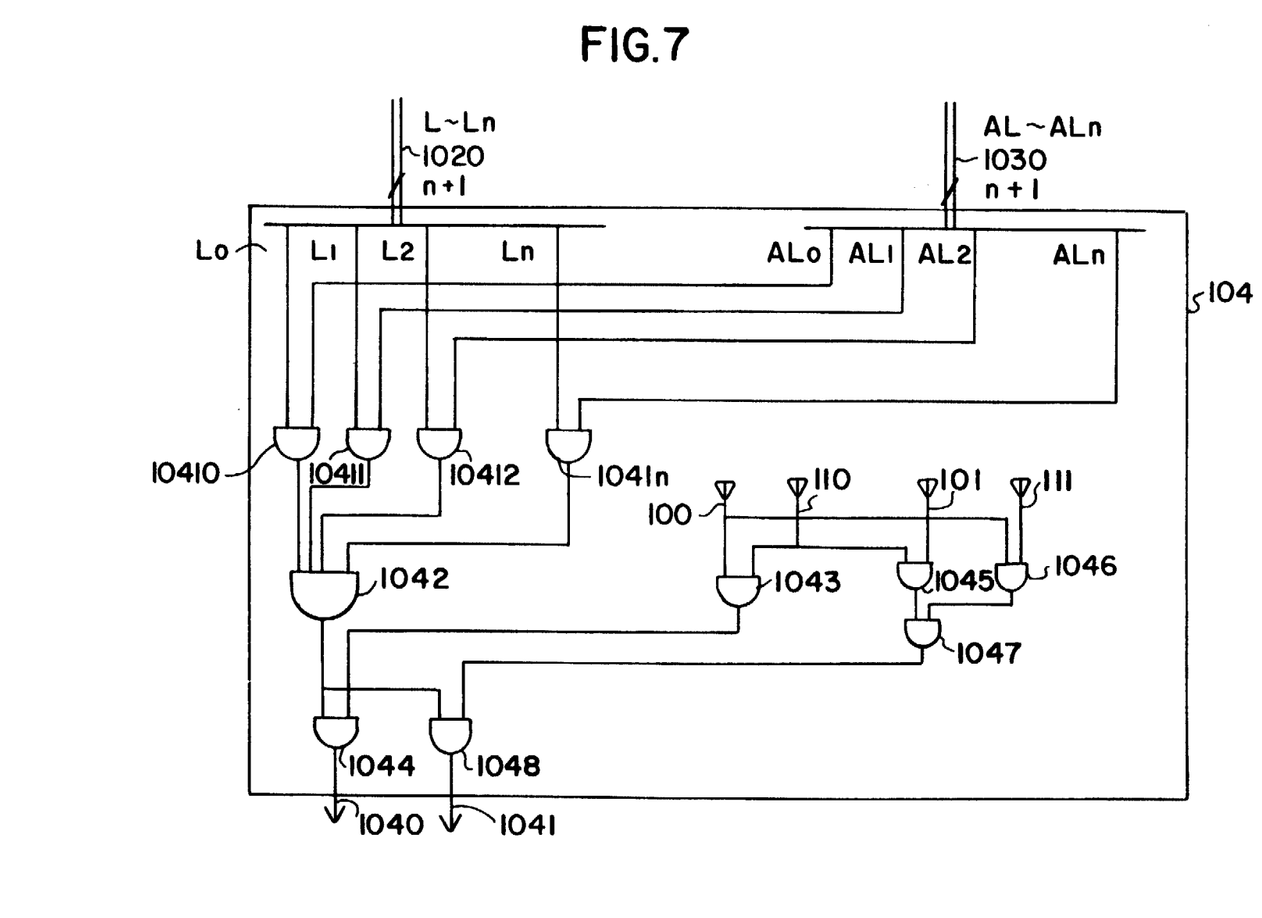
FIG. 7 illustrates the arrangement of the competition judging circuit 104 shown in FIG. 2.

Referring to FIGS. 2 and 7, the logical product of the lock designating signal supplied from the lock designating register 102 via the line 1020 and the other system lock designating signal supplied from the other system lock designating register 103 via the line 1030 is obtained by a group of AND gates 10410-1041n. The logical sums of the resultant AND's are obtained by an OR gate 1042.

Thus, if locking requests simultaneously come from the own and other systems, or a locking request and an unlocking request are made at the same time, and if even one each of the own system and other system lock designations overlaps in bit position, competition will occur.

This competition judging circuit 104 obtains the bit-by-bit logical products of the lock designating signal and the other system lock designating signal and, if coincidence is found in at least one matching pair of bits, the output of said OR gate 1042 will be "1" to indicate the occurrence of competition.

The logical product of an own locking request supplied via the line 100 and an other system locking request supplied via the line 110 is obtained by an AND gate 1043. After that, the logical product of the AND from the AND gate 1043 and the output of the OR gate 1042 is obtained by an AND gate 1044. The lock competition signal sent from this AND gate via the line 1040 indicates lock competition occurring from competition between the own system locking request and the other system locking request.

There is another type of competition, that is competition between a locking request and an unlocking request. Thus, the logical product of the other system lock signal provided via the line 110 and the own system unlock signal provided via the line 101 is obtained by an AND gate 1045. Also, the logical product of the own system lock signal provided via the line 100 and the other system unlock signal provided via the line 111 is obtained by an AND gate 1046. The logical sum of the outputs of the AND gates 1045 and 1046 is obtained by an OR gate 1047. Then, the logical product of the OR gates 1047 and 1042 is obtained by an AND gate 1048. A lock competition signal generated by the AND gate 1048 on the line 1041 indicates unlock competition resulting from competition either between an other system locking request and an own system unlocking request or between an own system locking request and an other system unlocking request.

In the absence of competition, lock judgement for both the own and other systems is performed.

One of the features of the present invention is the premise that each of the system control units 10 and 11 holds locking requests from processors connected to the own system and, at the same time, locking requests coming from processors of another system via the system control units 10 and 11 of the other system. Another feature of the invention in the equipment of the judging means 108 and 109 responsive to locking requests thereby held for judging that bits designated by lock designations are not locked. These features make dispensable much of the information to be otherwise transferred for the locking purpose between system control units, and therefore make it possible to dispense with much of the hardware otherwise needed for the transferring purpose. The present invention further serves to simplify controls as the locked state of the whole system can be checked by examining the contents of only one system control unit. The lock information held therein, as it takes no time for transfer, is always up to date and permits consecutive locks.

What is claimed is:

1. A lock processing system connecting a plurality of system apparatuses, each system control apparatus being connected to a plurality of processors and having a locking function for exclusive control, the lock processing system comprising:

first lock information storage means for receiving and storing lock information supplied from a processor, the processor being connected to an own system control apparatus, the storage means being responsive to an own system successful lock signal or an own system unlocking request;

transfer means for mutually transferring between the own system control apparatus and another system control apparatus connected thereto lock information from other processors connected to each system control apparatus;

second lock information storage means for storing lock information supplied from a processor, the processor being connected to another system control apparatus via said transfer means;

an own system lock judging means for judging, on a basis of lock information from said first lock information storage means, whether or not locking of the own system control apparatus has been successful;

other system lock judging means for judging, on a basis of lock information from said second lock information storage means, whether or not locking of the other system control apparatus has been successful; and a competition judging circuit for passing judgment when locking requests are simultaneously given from the own and the other system;

wherein the other system has a lock data preparing circuit for generating lock data for the other system upon successful locking and unlocking, the other system having a lock data register responsive to another system successful lock signal or to another system lock designating signal supplied from the system control unit for storing data from the other lock data preparing circuit, the other system lock judging circuit judging if the other system has been successfully locked, on the basis of the lock byte from a lock byte register, the other system lock data from the lock data register, the other system lock designating signal from the other system lock designating circuit, the lock competition signal, an unlock competition signal from a competition judging signal and an other system locking request signal, responsive to successful locking of the other system for generating another system successful locking signal;

each system control apparatus holding requests from the processors connected to the own system and, at the same time, locking request from processors of another system via the system control units of the other system, the judging circuit being responsive to locking requests held for judging that bits designated by lock designations are not locked.

2. A lock processing system comprising:
an own set of processors which generate own lock or unlock requests;
an other set of processors which generate other lock or unlock requests;
an own system control unit which receives said own lock or unlock requests;
an other system control unit which receives said other lock or unlock requests;
storage means responsive to an own system successful lock signal or an own system unlocking request;
transfer means for transferring said own lock or unlock requests and said other lock or unlock requests between said own system control unit and said other system control unit;

judging means for judging when one of said own lock or unlock requests or said other lock or unlock requests are completed;

delaying means for delaying one of an own system lock or unlock requests or said other system lock or unlock requests until said judging means indicates completion; and a competition judging circuit for passing judgement when locking requests are simultaneously given from an own and an other system;

wherein the other system has a lock data preparing circuit for generating lock data for the other system upon successful locking and unlocking, the other system having a lock data register responsive to an other system successful lock signal or to another system lock designating signal supplied from the system control unit for storing data from an other lock data preparing circuit, an other system lock judging circuit judging if the other system has been successfully locked, on the basis of a lock byte from a lock byte register, the other system lock data from the lock data register, the other system lock designating signal from an other system lock designating circuit, a lock competition signal and an unlock competition signal from a competition judging signal and an other system locking request signal, responsive to successful locking of the other system for generating another system successful locking signal;

each system control unit holding requests from the processors connected to the own system and, at the same time, locking request from processors of an other system via the system control of the other system,;

the judging circuit being responsive to locking requests held for judging that bits designated by lock designations are not locked.

3. A lock processing system as claimed in claim 2, wherein said judging means also judges whether said other system control unit and said own system control unit are competing for priority.

4. A lock processing method comprising the steps of:
generating own lock or unlock requests from an own set of processors;
generating other lock or unlock requests from another set of processors;
providing said own lock or unlock requests to an own system control unit;
transmitting to another system control unit said other lock or unlock requests;
transferring said own lock or unlock requests and said other lock or unlock requests between said own system control unit and said other system control unit;
judging when one of said own lock or unlock requests or said other lock or unlock requests is completed;
delaying one of an own system lock or unlock requests or another system lock or unlock requests until such judging means indicates completion; and
passing judgment when locking requests are simultaneously given from an own and the other system by means of a competition judging circuit
wherein the other system has a lock data preparing circuit for generating lock data for the other system upon successful locking and unlocking, the other system having a lock data register responsive to an other system successful lock signal or to another system lock designating signal supplied from the system control unit for storing data from an other lock data preparing circuit, the other system lock judging circuit judging if the other system has been successfully locked, on the basis of a lock byte from a lock byte register, the other system lock data from the register, the other system lock designating signal from the other system lock designating circuit, the lock competition signal and an unlock competition signal from a competition judging signal and the other system locking request signal, responsive to successful locking of the other system for generating another system successful locking signal;

each system control unit holding requests from the processors connected to the own system and, at the same time, locking request from processors of another system via the system control of the other system;

the judging circuit being responsive to locking requests held for judging that bits designated by lock designations are not locked.

* * * * *